US000001911H

United States Statutory Invention Registration [19]

[11] Reg. Number: H1,911

Land

[45] Published: Nov. 7, 2000

[54] CURING OPTICAL MATERIAL IN A PLANE OPTICAL RESONANT CAVITY

[75] Inventor: Peter L. Land, Dayton, Ohio

[73] Assignee: The United States of America as represented by the Secretary of the Air Force, Washington, D.C.

[21] Appl. No.: 08/583,693

[22] Filed: Jan. 5, 1996

Related U.S. Application Data

[63] Continuation-in-part of application No. 07/908,693, Jul. 1, 1992, abandoned, and a continuation-in-part of application No. 08/131,919, Oct. 4, 1993, abandoned, and a continuation-in-part of application No. 08/583,693, Jan. 5, 1996, abandoned.

[51] Int. Cl.[7] ..... B29D 11/00

[52] U.S. Cl. ..... 264/1.36; 264/1.38; 264/432; 425/174.4; 359/900

[58] Field of Search ..... 264/1.36, 1.37, 264/1.38, 432; 425/174.4; 359/900

[56] References Cited

U.S. PATENT DOCUMENTS

| | | | |
|---|---|---|---|
| 4,023,259 | 5/1977 | Kubota et al. | 29/592 |
| 4,364,168 | 12/1982 | Matsuyama et al. | 29/592 R |
| 4,546,244 | 10/1985 | Miller | 372/45 |
| 4,728,547 | 3/1988 | Vaz et al. | 428/1 |
| 4,818,070 | 4/1989 | Gunjima et al. | 350/334 |
| 4,925,708 | 5/1990 | Waters et al. | 428/1 |
| 4,938,568 | 7/1990 | Margerum et al. | 350/334 |
| 5,032,009 | 7/1991 | Gibbons et al. | 359/900 |
| 5,076,974 | 12/1991 | Modrek et al. | 264/22 |
| 5,084,203 | 1/1992 | Sansone et al. | 252/299.5 |

OTHER PUBLICATIONS

*Optical Waves In Crystals*, Yariv et al, John Wiley & Sons, NY (1984) pp. 288–293.

*Fundamentals Of Optics*, Jenkins et al., 4th Ed, McGraw Hill Book Co., NY (1976) pp. 301–302.

*Principles Of Optics—Electromagnetic Theory Of Propagation, Interference and Diffraction of Light*, Born et al, 3rd Rev Ed, Pergamon Press, NY (1978) pp. 323–331.

*Handbook Of Optics*, Driscoll, Ed, McGraw–Hill Book Co., NY (1978) p8–76—8–71.

*Primary Examiner*—Peter A. Nelson

*Attorney, Agent, or Firm*—Bobby D. Scearce; Thomas L. Kundert

[57] ABSTRACT

A method for curing an optically sensitive material or for fabricating an optical filter is described which comprises the steps of disposing a thin film of optically sensitive material within a plane optical cavity capable of resonating at selected optical frequencies having boundary reflectivities greater than 50 percent at some wavelength, polarization and angle of incidence and being capable of resonating at selected optical frequencies and exposing cavity and material to sensitizing light, such as a laser, of preselected wavelength or wavelengths suitable for initiating cure within the material and optionally for establishing one or more specified sets of resonant standing wave patterns within the material when the cavity is oriented at a suitable angle to the incident light.

25 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CURING OPTICAL MATERIAL IN A PLANE OPTICAL RESONANT CAVITY

This application is a continuation-in-part of application Ser. No. 07/908,693 filed Jul. 1, 1992, and is a continuation-in-part of application Ser. No. 08/131,919 filed Oct. 4, 1993, and is a continuation-in-part of 08/583,693 filed Jan. 5, 1996, all of which are abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for the fabrication of optical filters.

It is a principal object of the invention to provide an improved method for fabricating optical filters.

It is a further object of the invention to provide a method for optically sensitizing and curing an optical material within an optical cavity capable of resonating a selected optical frequencies in the formation therein of an electrically tunable optical filter and/or a selectively modulated refractive index film which may be used as an optical filter.

These and other objects of the invention will become apparent as a detailed description of representative embodiments proceeds.

SUMMARY OF THE INVENTION

In accordance with the stated objects of the invention, a method for curing an optically sensitive material, which may consist of one or more parts, is described which comprises the steps of disposing a thin film of the material within a plane optical cavity capable of resonating at selected optical frequencies and selected angles of incidence by virtue of having boundary reflectances greater than 50% for some wavelength and polarization, such as a Fabry-Perot cavity, and exposing cavity and material to sensitizing light in the form of a collimated laser beam comprising a preselected wavelength or wavelengths suitable for curing in initiating cure of the material and optionally for generating one or more specified sets of resonant standing wave patterns within the material when the cavity is oriented at a suitable angle to the beam. Optional reflectors such as plane mirrors may be placed external of the cavity to reflect and intensify the sensitizing light within the material as a means of improving general microstructure control and/or local control of the orientation composition and refractive index of the cured material, thereby improving the optical properties affecting the desired performance of an optical filter.

The resonant optical cavity may (1) enhance the effectiveness of a laser source sensitizing and/or curing a material or a material mixture by increasing the intensity within the cavity relative to the incident beam intensity thereby increasing the curing rate and enhancing the development of a hologram and/or electrooptical material; (2) may be used as a tunable comb filter capable of transmitting a series of narrow spectral lines corresponding to the cavity resonance frequencies, separated by relatively broader regions of reflection, the filter comprising cured electro-optical material and conductive reflectors to provide for electrical tuning over a free spectral range; and/or (3) may provide one or more specific optical standing wave patterns within the cavity in order to develop one or more distinct patterns of index modulation within the cured material and one or more desired light filtering characteristics.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
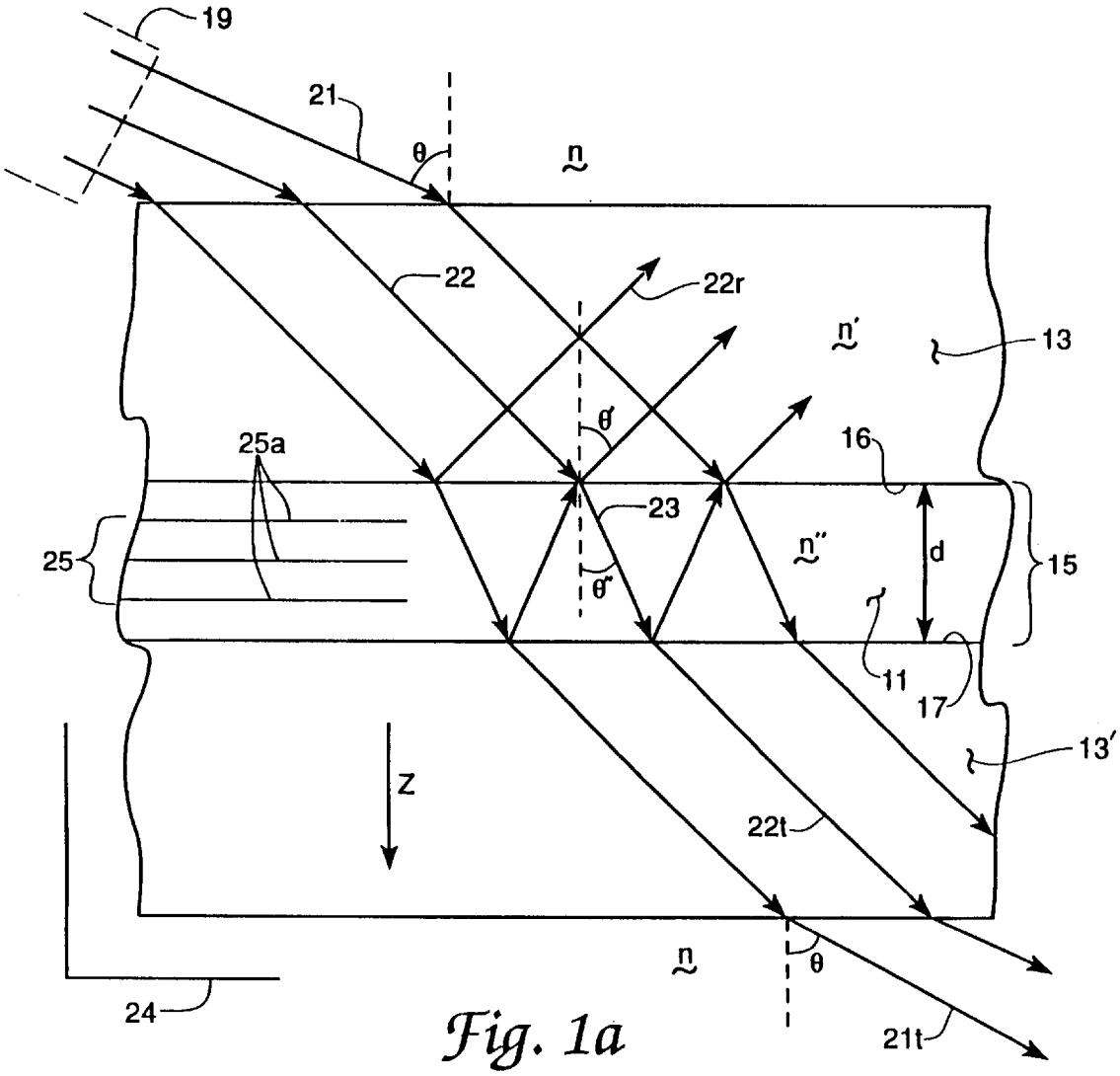
FIG. 1*a* is a schematic representation of a simplified optical arrangement for curing an optical material within a plane resonant optical cavity according to the invention.

Herein the term "resonant optical cavity" means that the cavity will be configured to be capable of supporting resonance of one or more selected frequencies of interest resulting in selected standing optical wave patterns within the cavity either during the process of optically sensitizing and curing an included material, and/or subsequently when the cavity and cured material within may be used as a device such as a tunable optical filter. The term "sensitizing" refers to a light induced change within one or more components of a material or material mixture that enables one or more associated curing processes to occur. The curing configurations described infra consist of a plane resonant cavity and various associated external components configured to permit the development of one or more standing wave patterns within a cavity which result from multiple reflections of light at the boundaries of the resonant optical cavity and possibly contributed to by reflections from external mirrors placed outside the resonant cavity containing the material to be cured; for the purposes of this invention, reflections at a resonant cavity boundary for resonance curing of a material or material mixture shall be considered to be greater than 50%.

Herein the term "optically sensitive material or material mixture" includes liquids and/or solids to be placed within or configured to be an optical resonant cavity wherein the materials will be caused to be substantially modified to a desired useful state (cured) permanently or temporarily, in whole or in part, on a local or gross scale as a result of being exposed to unpolarized laser light or laser light of selected polarization having internal to the resonant optical cavity a spatially varying or alternatively an approximately uniform average intensity (power/area) and fluence (energy/area) or energy density (energy/volume). The processes of modification (curing) to a desired useful state during and following an exposure may include displacement and/or diffusion of mass or charge, reorientation of molecules, segregation and polymerization processes and may depend on selected environmental conditions such as temperature, electric and stress fields.

Herein the term "holographic material" means any material that develops a systematic spatial variation in complex refractive index that relates directly to and is the result of a spatially varying exposure to light. The term electrooptic material means any material whose complex refractive index is modified when the material is subjected to an applied electric field which may be constant or temporarily varying.

Modifications (curing) may include but are not limited to orientation and/or polymerization and/or segregation of monomer molecules comprising part or all of a material or material mixture, accompanied by the development of a dominant more or less uniform or alternatively a specifically modulated complex refractive index which may depend on the local mass and charge density, molecular segregation and local or gross orientation of material components as derived from the original material, and may include the development of suitable mechanical properties and chemical stability together with desired optical, electro-optical, thermo-optical and/or holographic properties.

For example, curing in a resonant optical cavity may include segregation of components of a mixture, such as liquid or plastic crystal type molecules, into spaces bounded by a solid matrix, the inclusions having dimensions of the order of or smaller than optical wavelengths, optical wavelengths being those extending from the near ultraviolet through far infrared, yielding a material and optical filter whose optical properties may be subsequently modified by applying or changing electric, magnetic or stress fields or temperature. Such materials include the so-called PDLC material which is discussed in detail infra.

Referring now to the drawings, FIG. 1*a* shows schematically the essential optical elements for curing or sensitizing optically sensitive (holographic or electrooptic) material within resonant optical cavity 15 according to the invention. A film of material 11 to be cured is supported on substrates 13,13' of suitable optical material and disposed within cavity 15. Substrates 13,13' may comprise any suitable optical material such as fused silica, calcium fluoride, zinc sulfide, zinc selenide, oxide or chalcogenide glass or plastic with optional exterior antireflection coatings.

Fabry-Perot (F-P) optical resonant cavities are configured to have a thickness which is very small compared to the lateral extent. The boundaries which affect the function of a simple F-P cavity of the type under consideration here are only two. These boundary layers are parallel to a thin layer of material to be cured whose thickness is small compared to its lateral extent. One boundary must be partially transmitting in order that optical energy can be admitted to the cavity; it also must be substantially reflective in order that in-phase multiple reflections at selected wavelengths cause the development of a resonance condition, such that a so-called standing optical wave is established within the cavity. The second boundary of a F-P resonant cavity is normally substantially partially reflective, but can in special cases be made nominally totally reflective (See *Optical Waves in Crystals*, A. Yariv and P. Yeh, pp. 288–293, John Wiley and Sons, New York (1984)). The procedures described in this disclosure are clearly distinct from other prior procedures for curing optical material in cavities (see, for example, Gibbons et al, U.S. Pat. No. 5,032,009 and Modrek et al U.S. Pat. No. 5,076,974) in that here the cavity is a simple, plane resonant F-P type cavity having reflecting boundaries with specified minimum reflectivities. The distinctive structure and properties of and terminology associated with F-P type cavities and simple F-P cavities in particular are developed and illustrated in detail in *Fundamentals of Optics*, F. A. Jenkins and H. E. White, 4th edition, pp. 301–302, McGraw Hill Book Co. New York (1976); *Principles of Optics— Electromagnetic Theory of Propagation, Interference and Diffraction of Light*, Third Revised Edition, M. Born and E. Wolf, pp. 323–331, Pergamon Press, New York (1965); *Handbook of Optics*, W. G. Driscoll, Ed, pp. 8-76–8-81, McGraw Hill Book Co., New York (1978); and Yariv et al, supra, the entire teachings of which references are incorporated herein by reference.

Cavity 15 is preferably a Fabry-Perot (F-P) type having optical thickness n"d, where n" is the refractive index of material 11 and d the thickness of cavity 15 defined between reflectors 16,17 which may comprise any of a reflective refractive index step or interface, partially transparent metallic films or dielectric interference films in like pairs or other combinations. Reflectors 16,17 may comprise simple refractive index steps for large incidence angles or metal films of aluminum, silver, gold or copper of thickness of about 200 Å or less and/or dielectric modulated dielectric films, consisting of one or more anions such as oxygen, fluorine or nitrogen chemically combined with metals such as indium, tin, magnesium, silicon, aluminum, cerium, thorium, yttrium, lanthanum, zirconium, lead, zinc or titanium, the films being capable of substantially reflecting one or more curing wavelengths of light incident at a prescribed range of angles of incidence and state of polarization; other reflective materials may be found suitable by the skilled artisan practicing the invention, and the metal or multilayer dielectric films may be coated to prevent reaction with material 11.

Variations from the resonant cavity arrangement of FIG. 1 include a resonant cavity formed by a plane film drawn from a liquid to be cured where the curing light is incident at a large angle causing high reflectance at the film/air interface, or a situation where the second reflector 17 comprises an interface between material 11 and a supporting substrate 13' which may be either of a liquid or solid, either transparent or absorbing and may reflect up to 100% of light incident at the interface.

The invention resides in the use of an optical resonant cavity to increase the effectiveness of light energy available from a laser source 19 in initiating or causing a curing process to occur within a material 11 having a curing sensitivity dependent on the amount of exposure to light and temperature, to form a tunable plane cavity filter and/or Bragg interference filter and/or grating comprising the cured material 11, the Bragg filter and/or grating having refractive index of preselected periodic modulation. Cavity 15 enhances the strength of the optical field therewithin which promotes rapid curing of material 11 to induce a modulated refractive index in the cured material. Accordingly, light beam 21, originating from a laser source 19 of selected wavelength, is incident at angle θ on substrate 13, projects through substrate 13 as beam 22 and into material 11 as beam 23 at selected angle θ" relative to a normal to films 16,17. Gas lasers such as argon, krypton, argon-krypton, nitrogen, xenon, xenon-chloride and xenon-fluoride lasers may be suitable for use for curing, as may liquid and solid state lasers including dye, color center and semiconductor type used in either a pulsed or continuous mode of operation. As a general proposition, material 11 and cavity 15 may be disposed within a hermetically sealed chamber 24 for thermal control (heating or cooling) or material 11 during cure, and means (not shown) may be included in or attached to the housing defining chamber 24 for controlling the temperature of material 11 and for passing beam 21 into chamber 24. Subsequent to laser exposure, broad-band light source or thermal treatment may be used to complete curing in all portions of material 11.

Any material 11 which is curable by light irradiation using any part of the optical spectrum may be sensitized and cured in cavity 15 according to the invention. However, cured materials 11 of primary interest for fabrication of tunable F-P and fixed Bragg type filters according to the invention comprise optically clear and (optionally) optically active (refractive index varies under an applied electric field) polymer dispersed liquid crystals (PDLC)), also called liquid crystal composites (LCC), comprising a polymer matrix containing inclusions (preferably spherical with average optical diameter of the order of one-tenth or less of the wavelengths significant to the resulting filter) of one or more kinds of liquid crystal (LC) type molecules. The precursor materials used in forming PDLC material typically include mixtures of (1) prepolymers or monomers, (2) curing agents consisting of one or more molecule types one or more of which types may absorb the curing light (i.e., be sensitized) resulting in reconfigured electron charge or atomic arrangement suitable to promotion of linking and cross linking of the prepolymers to form a polymer, and (3) one or more LC type molecules. Some suitable prepolymer and curing agent mixtures are available commercially as light curable optical adhesives. Mixtures of the aforementioned material types, when exposed to light of appropriate wavelength of sufficient intensity under appropriate conditions, polymerize in a manner resulting in segregation of a substantial portion of the LC material within inclusions in the polymer matrix. Material 11 may include but is not limited to all the light curable mixtures cited specifically and by reference in U.S. Pat. No. 5,084,203. Examples are ultraviolet (UV) cured adhesive materials series NOA 60 through NOA 81 (Norland Products, Inc., New Brunswick N.J.). A specific example is Norland 60 epoxy resin, which contains Daocure 1173 photoinitiator (EM Industries, Hawthorn N.Y.), mixed with portions of some or all of the components of a LC eutectic mixture designated as E7 (EM Industries), which when cured at a reduced temperature of about −10 to 15° C., yields a clear LCC exhibiting a large Kerr constant. Mixtures included in the above reference, and others capable of being cured by UV or visible light, will develop holograms and Bragg type interference filters when suitably illuminated by monochromatic light. The mnicrostructure of the cured PDLC material, degree of segregation of LC mixtures into inclusions, and degree of permanency of optical properties of cured material 11 are dependent on the percentage of components in the mixture, light intensity and dose and curing temperature profile. For example, as indicated in U.S. Pat. No. 5,084,203 and related work, a cured mixture including more than about 30% E7 in Norland 60 did not yield a stable optical film; some E7 migrated to the film boundary. High intensity UV curing by a broad-band source caused heating of films and resulted in irregular elongated inclusions which are prone to a greater degree of light scattering than spherical inclusions of comparable volume, and as the degree of connectivity increases, to open porosity and an unstable film. Curing similar mixtures with an argon laser at reduced temperature resulted in primarily spherical inclusions and clear films. Optical clarity of films increased with curing intensity and was also increased by reducing the LC content of a mixture. Smaller inclusions contribute less per unit volume to the Kerr effect than larger inclusions. Small average size LC inclusions may be associated with a small percentage of segregated LC; this may result in gain in clarity at the expense of optical activity and/or index modulation. The experimental data generally indicates that E7 in Norland 60 and other mixtures as well, are likely to yield better tunable filters and Bragg filters if exposed to the maximum available laser intensity while held at a reduced temperature. Post irradiation curing by a broad band light source or by heating above the ambient temperature may enhance film properties.

A major difference between PDLCs and some other holographic materials is that curing is relatively simple in that polymerization and LC segregation is initiated and continues to a desired state as a result of light and temperature exposure.

If, in addition to being sensitized, material 11 is partially cured by a monochromatic standing wave within an optical cavity, index modulation developed during exposure will reflect and therefore gradually reduce effectiveness of the incident light, particularly on the down-beam side of material 11. Measures to minimize this reduction in effectiveness may include cooling to temporarily retard the mobility of curing agents and the rate of reactions resulting in index modulation and polymerization during irradiation, and increasing the light intensity to the maximum amount consistent with a selected total dose (fluence in joules/$cm^2$) and with the available equipment and desired product.

If no modulation is desired, which may be the case for an electrooptical tunable filter product, curing may be done with a broad range of wavelengths; to ensure the fullest degree of curing of material 11 and greatest electrooptic effect in a film, measures to move standing waves within the film can be utilized such as changing the angle (wavelength) or phase of the light within material 11. A continuously tunable laser such as a dye laser may be used for curing under resonant conditions in this case. An alternative is to use a curing wavelength and/or a polarization outside the resonant range of the optical resonant cavity.

An advantage of curing material in a resonant optical cavity is that light intensity at a selected wavelength can grow in optical field strength to several times the intensity outside the cavity. This amplification is limited by the cavity Q, or finesse, which decreases with decreasing reflectivity, with cavity asymmetry, with cavity imperfection, and with the absorption and scattering by material 11 and by the material selected for (reflective and optionally electrically conductive) films 16,17. The resonant wavelengths λ referenced to vacuum, satisfy the relationship, $$\lambda(m-\phi/\pi)=2n''d\cos\theta'' \quad (1)$$

where m is a positive integer, φ is one-half the sum of the phase changes associated with internal reflection at films 16,17, (m−φ/π) is greater than zero, n" is the average refractive index of material 11 (presumed isotropic), d is the spacing between films 16,17, and θ" is the angle between a normal to films 16,17 and the optical rays within cavity 15. Snell's law nsinθ=n'sinθ'=n "Sinθ", describes the relationship among angles θ, θ', θ" for beam 21 incident in air (n≈1) at angle θ to a normal to substrate 13; θ' and θ" are the angles between beams 22,23 and a normal within substrates 13 and material 11, respectively.

Figure 1B:
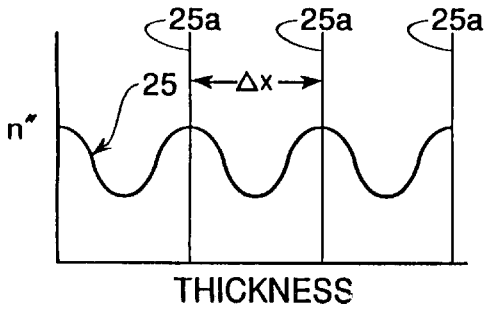
FIG. 1*b* shows a plot of refractive index versus thickness of material illustrating the modulated refractive index pattern suggested in FIG. 1*a*.

By adjusting θ (assuming other possible variables fixed) a selected major line from source 19 can be made to resonate within cavity 15 for angles θ" satisfying eq (1), thereby developing a standing optical wave and subsequent one-dimensional differential sensitizing and curing of material 11 leading to index modulation as shown in FIG. 1*b*. The period of index modulation Δx is in accordance with the following general equations for interfering degenerate plane waves:

$$2\pi/\Delta x=|\Delta k''|=2|k''|\sin(\alpha/2)=4\pi\sin(\alpha/2)/\lambda'' \quad (2)$$

and $$\Delta x=\lambda''/2\sin(\alpha/2)=\lambda/2n''\sin(\alpha/2) \quad (3)$$

where Δk" is the vector difference between k" vector pairs in material 11 and α is the angle between a pair of k" vectors, λ"=λ/n" is the optical wavelength in material 11, and k"=2π/λ" is the magnitude of the k" vectors. In FIGS. 1*a* and 2*b*, there are only two k" vectors of equal magnitude within material 11, since material 11 is presumed isotropic; the angle between interfering wave fronts or k vectors is α=π−2θ". In those figures where four k vectors exist in the cured material 11, α=2θ",π, π−2θ". The index modulation maxima may be coincident with or displaced by up to ¼ wavelength from the loops of the standing wave depending on how the index develops relative to the location of the loops and nodes of a standing wave. The associated phase factor and those associated with the boundaries of a F-P cavity are major considerations for the performance of filters developed between index modulated films where, for example, the induced index modulation of material 11 parallel to the reflecting films may be required to be approximately in phase with and of the same optical period as that of the original periodic films 16,17.

FIG. 1*a* illustrates formation of a single plane periodic spatial index modulation resulting from curing with a resonant standing wave where θ is selected to provide resonance at an efficient curing wavelength. Index modulation 25 resulting from the irradiation scheme shown in FIG. 1*a* is suggested by straight lines 25*a* representative of loci of maximum refractive index across the thickness of material 11 upon completion of cure.

FIG. 1*b* shows a plot of refractive index n" versus thickness t of material 11 illustrating (not to scale) the modulated refractive index pattern suggested at 25 in FIG. 1*a* where index loci are indicated on the plot by lines 25*a*. The spacing Δx between lines 25*a* of maximum refractive index is dependent on θ" and θ in accordance with Snell's law and Eqs (1)–(3).

Formation of a simple tunable F-P filter, for which resonant responses within a spectral band of interest are approximately equal in magnitude, is of particular interest within these teachings. Tuning may be accomplished by an electric field through the cured electrooptical material 11 by applying a voltage to (metallic) films 16,17 serving as electrodes. In some cases the F-P cavity boundaries may be highly reflective to s-polarized but not to p-polarized light at a selected angle of incidence, or to visible and/or infrared (IR) while being fairly transmissive to UV, examples being a suitable dielectric interface, dielectric stack and/or thin silver film. Since modulation of the index in material 11 may not be an object of curing, it may be most advantageous to cure with p-polarized light when boundary reflections are due to dielectric structures, or with a laser having a strong UV emission when the boundary reflections are due to a silver film. Silver transmission in the UV peaks near 320 nm which is near the emission of a xenon chloride helium-cadmium laser. If material 11 is sufficiently transparent for approximately uniform curing through the depth thereof, formation of a tunable F-P cavity of PDLC material may preferably employ a xenon chloride laser with retroreflection by external mirrors of the light passing through or being reflected from the cavity and supporting substrates as discussed more fully below.

Another objective of the invention is the preparation of high optical density single line or multiline optical filters. Thus if films 16,17 bounding the F-P cavity are moderately reflective to a selected laser wavelength at a selected angle, tuning will permit a curing wavelength to resonate within the cavity and generate a modulation that will sharpen and intensify the reflection band at normal incidence for a selected wavelength. If a resulting reflection band is to be intentionally broadened, this can be done by angle tuning to a somewhat different, possibly neighboring, resonance condition, which will suitably modify the index modulation of material 11. In this application, an objective may be an index modulation 25 in material 11 between modulated films 16,17 so that the resulting total modulation has no substantial discontinuity or glitch, therefore acting as a continuous, though not necessarily homogeneous, Bragg filter. It is presumed that films 16,17 can be terminated so as to accommodate this condition.

Another objective of the invention is the preparation of Bragg type filters which reflect wavelengths long compared to the curing wavelength. In this case θ' and θ" are large, α is small, and reflection required to produce a F-P cavity may be achieved by providing an appropriate difference in refractive index between substrate 13 and material 11; films 16,17 may not be required in such a case.

A F-P cavity may be angle tuned to transmit a particularly strong or effective laser line; the resonant wavelengths are proportional to cosθ", so changes with angle are smallest near normal incidence. However, a cavity with n"d−40 microns, can be tuned between neighboring harmonic orders with angle changes from normal to about 5°. This allows tuning to the strongest or most effective line for curing.

Referring now generally to FIGS. 2–6, mirrors 27,28,57, 58 and optionally 35,59 placed adjacent cavity 15 permit reflection of transmitted and reflected beams back into cavity 15 and material 11 and to source 19. Material 11 cure rate may be enhanced by inducing source 19 to emit maximum energy with a frequency (wavelength) and polarization that is most effective in the curing process. In addition, the laser may have associated broad or narrow filters and polarizers (not shown) suited to the specifically desired device or curing configuration.

Source 19 may be operated in a multimode or in a single mode in which incident beam 21 may be characterized as having either s (electric vector perpendicular to the plane of the drawing) or p (electric vector in the plane of the drawing) polarization with respect to the interfaces between components of the structures of FIGS. 1*a*–6. Multimode operation with multiple wavelengths and mixed polarization may be appropriate to preparation of tunable filters without internal modulation. In general, when specific Bragg type filters are the product of curing an a cavity, either s or p polarization is selected. For lossless dielectrics the phase shift on internal reflection from a dielectric interface will be $\pi$ or 0, so standing waves of s and p polarization will occur at the same positions within F-P cavity 15 and material 11 if the material is isotropic. However, in general, and particularly for metal films, the factor $\phi$ in Eq (1) will be different from 0 and $\pi$ for each polarization, and there will be a displacement between the standing waves associated with each polarization.

Typically the reflection due to an interface between air and substrate 13 is small if $\theta$ is less than 20° for p-polarized light or less than or near the polarizing angle for s-polarized light. Snell's law imposes the limitation $\theta'<\theta'_c$ and $\theta''<\theta''_c$ where subscript c indicates the critical angle for total internal reflection. The curing configurations in FIGS. 1*a*–4 presume n<n'<n" so that $\theta''$ is limited to a midrange value when $\theta$ is near 90°. This limits the maximum spatial period $\Delta x$ of modulation 25 achievable using a specific curing wavelength and the structures of FIGS. 1–4. The prism coupled structures of FIGS. 5,6 (discussed infra) provide a mixed medium of approximately uniform index n' between air and the F-P cavity and permit $\theta''$ to be as large as needed for a specific filter product and yet to be associated with an angle $\theta$ providing low reflectance at the entrance interface between prism 47 or window 56 and air.

Figure 2A:
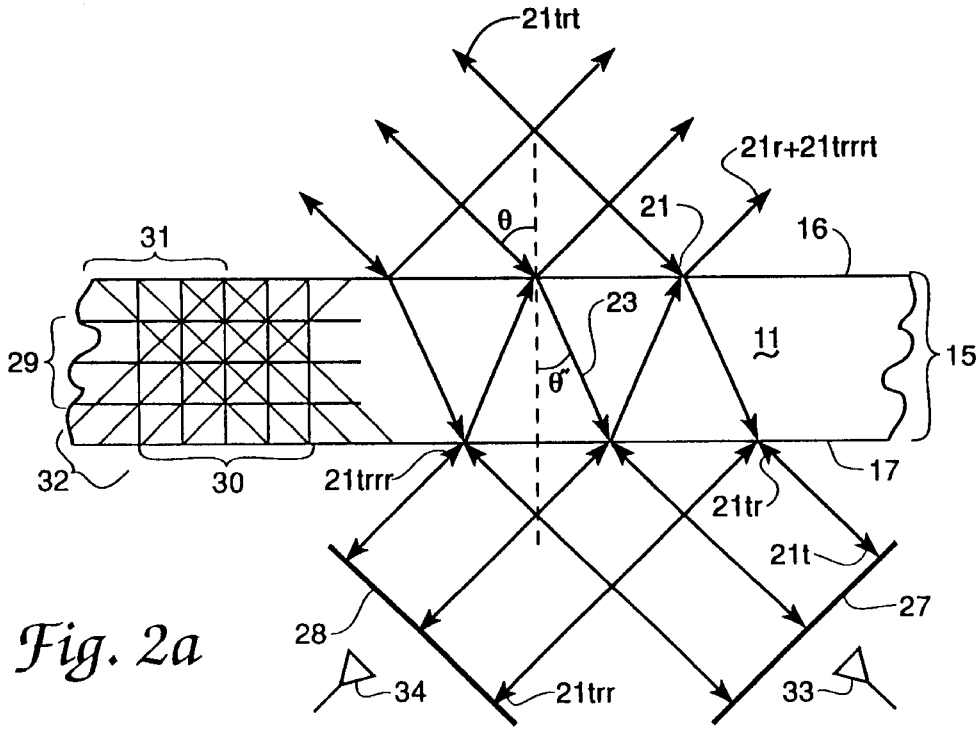
FIG. 2*a* illustrates an optical arrangement similar to FIG. 1*a* with the placement therein of mirrors for retroreflecting the primary beam back toward the optical cavity to enhance curing, and wherein the supporting substrate dimensions are shrunk to zero so that the rays shown outside the cavity are in air.
Figure 2B:
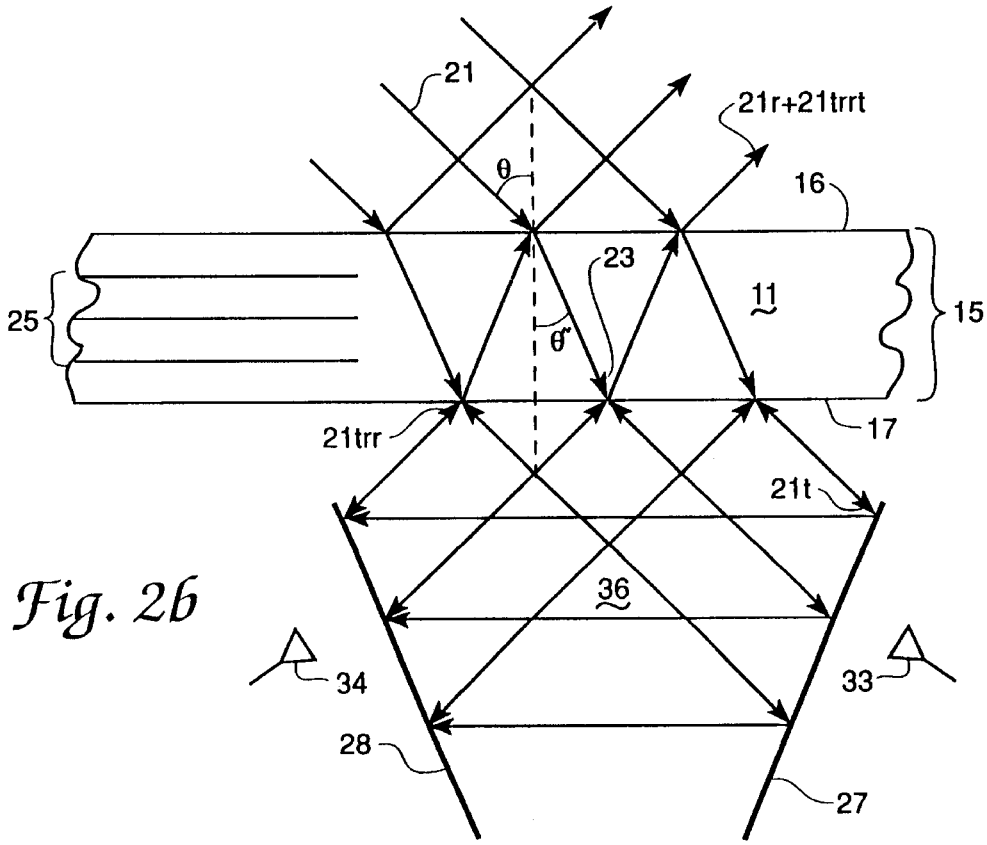
FIG. 2*b* shows an alternative arrangement of mirrors for reflecting a beam back into the optical cavity to enhance development of the single index modulation pattern shown in FIG. 1*b;*

Referring now specifically to FIG. 2*a*, placement or retroreflecting mirrors 27,28 can provide retroreflected beams $\mathbf{21}_{trr}$,$\mathbf{2}a_{trrr}$ to optical cavity 15 and $\mathbf{21}_{trt}$ to laser cavity 19 which may enhance the amount of laser emission at the resonant wavelength. Adjustment of the optical path length between mirrors 27,28 and film 17 in the direction parallel to the optical wave vector may be employed to cause either constructive or destructive interference between the external cavity formed by reflectors 27,28,17 and cavity 15 thereby exposing material 11 to either a primary traveling or a standing wave.

Retroreflecting mirror 35 may be added (FIG. 3) to increase exposure of material 11 to either running waves or standing resonant waves. If modulation is not desired, standing waves can be moved relative to cavity 15 by angular adjustments to mirrors 27,28,35 or to cavity 15 or by other means to decrease the index modulation amplitude of cured material 11. An alternative is to permit only modulation affecting wavelengths outside the range of the application.

The FIG. 2*a* arrangement results in development of orthogonal index modulation patterns 29,30 which are respectively parallel and perpendicular to films 16,17, and diagonal index modulation patterns 31,32, each being orthogonal to the difference vector $\Delta k$ between a k vector pair occurring within cavity 15. Proper selection of incidence angle $\theta$ may result in modulated patterns formed by exposure to monochromatic UV which are effective in dumping or blocking specified wavelengths within a selected operational band. Angle tuning for this arrangement is preferably achieved by maintaining incident beam 21 and mirror 27 fixed while rotating cavity 15 about an axis normal to the plane of FIG. 2*a*. If the indicated index modulation is desired, mirrors 28,35, if used, are adjusted by twice the amount of the cavity 15 angle adjustment and in the opposite angular direction to maintain a retroreflecting function.

Mirrors 27 and/or 28 may be partially transmissive in the interest of monitoring resonant conditions within cavity 15 and the external cavity using detectors 33 and/or 34. Alternatively, resonance monitoring may be achieved by measuring the intensity of scattered light exiting an edge of cavity 15. External mirrors 27,28,35 may be total internal reflection type, metallic with additional coatings to enhance reflection in a spectral range of interest, or multilayer dielectric or holographic.

FIG. 2*b* is an alternative arrangement of mirrors 27,28 which together with film 17 form a ring resonant cavity 36 which can be tuned to provide a simultaneous resonant condition in both cavities 15,36. The wave vector fed back into cavity 15 results in internal reflections that are parallel to those resulting from internal reflections of beam 23 so the only index modulation induced is 25.

It is to be understood in what follows that mirrors 27,28 in subsequent figures may be arranged as in FIG. 2*b* as an alternative to those shown, which correspond to FIG. 2*a*. In all cases it is presumed that one or more detectors can be used to monitor light intensity at selected locations and thereby permit manual or automated tuning or detuning of cavity 15 and any associated external optical cavity.

Figure 3:
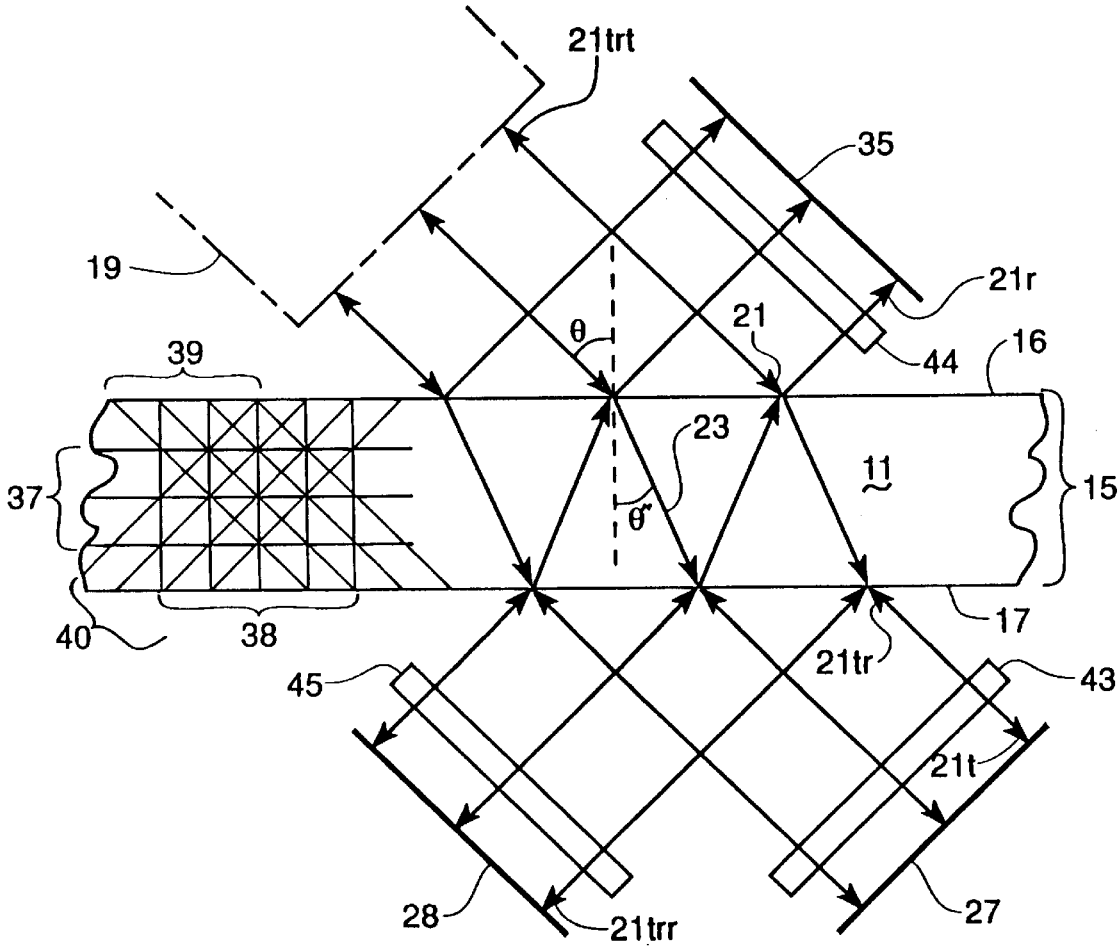
FIG. 3 shows an optical cavity arrangement similar to that of FIG. 2*a* with an additional retroreflecting mirror providing maximum feedback of laser light into the optical cavity, and including electro-optically or mechanically driven phase delay means for enhancing or diminishing the intensity of standing waves associated with development of an index modulation.

The FIG. 3 arrangement with mirrors 27,28,35 in place provides maximum feedback of light transmitted and reflected by cavity 15 and the associated substrates, which tends to increase the curing rate in material 11. For a resonant condition within cavity 15, the FIG. 3 arrangement results in four primary modulation patterns 37,38,39,40. Depending on the laser emission spectra, mirror 35 may increase the exposure of material 11 to nonresonant light, so the index modulation depth resulting from the FIG. 3 arrangement is expected to be less than for the FIGS. 1*a*,2*a*,2*b* arrangements. Optional means may be included to adjust the optical path length between each mirror 27,28,35 and cavity 15 to enhance development of a preferred modulation pattern or to wash out an unwanted pattern by detuning the coupled cavities. This may be achieved mechanically using a piezoelectric or alternative means to displace each mirror or electro-optically or mechanically by inserting a controllable phase delay medium 43,44,45 between each mirror 27,28,35 and cavity 15. An easy means of tuning the feedback cavities is for medium 43–45 to be plane parallel windows with means to provide slight variations in the angle between the incident and reflected light beams and the plane windows thus adjusting the optical path length between the mirrors and cavity 15.

Modulation patterns 37,38,39,40 may be substantially eliminated by rotating cavity 15 through successive resonance conditions so that developing patterns are swept through the structure and averaged out. Alternatively, cavity 15 may be rotated about or translated perpendicular to the cavity 15 normal direction thereby eliminating patterns 38–40.

The spectral width and angular aperture of a simple interference filter may be broadened by stepping the filter and mirror assembly through one or more resonances by making small angle changes in a case like that of FIGS. 2*a* or 2*b*, or by exposure at moderate to small fixed angles $\theta''$ with external mirror feedback as in FIG. 2*a*. For example, combinations of counterpropagating beams with $\theta''$ equal to ±5° result in angles, $\alpha$, between k vectors equal to 180, 10 and 170°, and superimposed index modulation with $\Delta x/\lambda''$ equal to 0.5, 5.74 and 0.502, respectively, assuming no change in average index and dimensions resulting from curing. Reflection spectra of normally incident light on such a modulated structure will have a broadened peak compared to a simple one-dimensional modulation, being a combination of two peaks, one due to the modulation parallel to the cavity boundaries having a peak at 1.004λ"; the other, due to the modulation at ±5°, having a peak at 0.996λ". If θ" equals ±10°, α equals 180, 20 and 160°, and Δx/λ" equals 0.5, 2.879, and 0.5077, respectively; the reflected wavelength peaks for normally incident light, treated as above, are at 1.0154λ" and 0.9848 λ".

The three high spatial frequency modulations 37,39,40 cause a compound filtering effect in which two of the overlapping spectral peaks shift to shorter wavelengths with increasing incidence angle θ and one shifts to longer wavelength initially and then to shorter wavelength. The ultimate shift is to a shorter wavelength. The effect of the normally coarse modulation spacing 30 or 38 (FIGS. 2*a*,3) may be useful or a nuisance. For small film thicknesses and small angles of incidence, this modulation may act as a Raman-Nath diffraction grating; and for modest incidence angles relative to material 11 and thicknesses much greater than the modulation spacing, the film may perform as a Bragg filter where the incidence angle relative to the periodic structure is large.

Figure 4A:
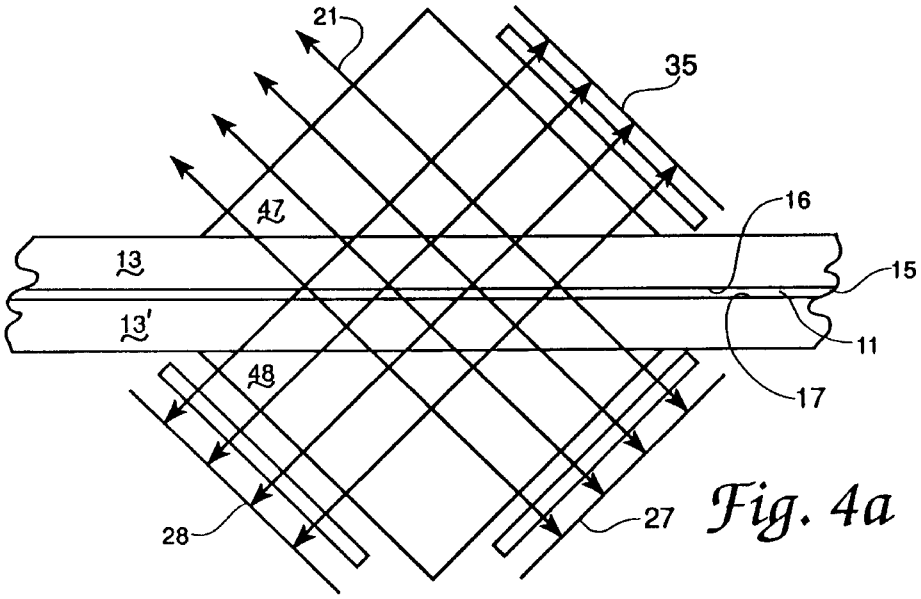
FIG. 4*a* shows an optical cavity arrangement similar to that of FIG. 3, wherein prisms having selected angular shape and an index matched to the substrate material are disposed adjacent to the substrates to allow light rays to enter and exit the cavity at large angles (approaching 90°), while providing efficient light transmission at angles between the normal to the prism surface and the Brewster angle from air into the approximately optically homogeneous medium comprising the prism, an index matching fluid and the substrate adjacent to the cavity.
Figure 4B:
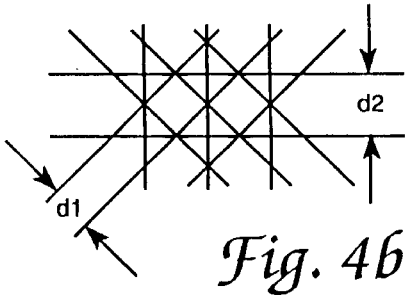
FIG. 4*b* illustrates the modulated refractive index pattern obtainable in the FIG. 4*a* arrangement.

FIGS. 4*a,b* and 5 show alternative setups for curing material in an optical resonant cavity which permit moderate incidence angles θ to result in large angles θ" and relatively long refractive index modulation periods in patterns 25,29 or 37. FIG. 4 shows prisms 47,48 of selected angular shape and having an index matched to substrates 13,13' disposed adjacent thereto, being separated only by a thin index matching layer (not shown). This arrangement permits an alternative range of angles of incidence θ of beams 21 and of angle θ" or beam 23 within cavity 15. The mirrors and phase delay elements shown adjacent to the prisms are optional and can be chosen so as to make the arrangement analogous to either of the FIGS. 1*a*,2*a*,2*b*, or 3, with similarly named elements functioning in equivalent manner.

If in the FIG. 4*a* arrangement the incident and reflected beams travel at 45° to films 16,17 while inside cavity 15, modulation spacings $d_1$ and $d_2$, respectively (FIG. 4*b*), are 1.0 and 1.41 times λ"/2. FIG. 4*a* illustrates the modulation planes and relative spatial frequencies. For angles in general, the modulation spacing Δx formed by each pair of propagating waves is given by Eq (3).

If the curing wavelength λ is 365 nm and θ" is 45°, the modulation with spacing $d_2$ parallel to films 16,17 reflects normally incident light of wavelength 516 nm. The modulation in the diagonal directions does not have much effect on normally incident visible light. It is noted that the second harmonic for index modulation 37 is equal to the first harmonic of the diagonal modulation 30,40 for normally incident 258 nm light. Assuming that normally incident 258 nm light is not absorbed by material 11, it will be partially reflected as a result of contributions of three of the four sets of modulations 37,39,40. Varying θ from normal causes splitting; two resonances shift downward in wavelength at different Δλ/Δθ' while one shifts upward in wavelength. If material 11 absorbs this wavelength strongly, these characteristics are of no consequence.

Figure 5:
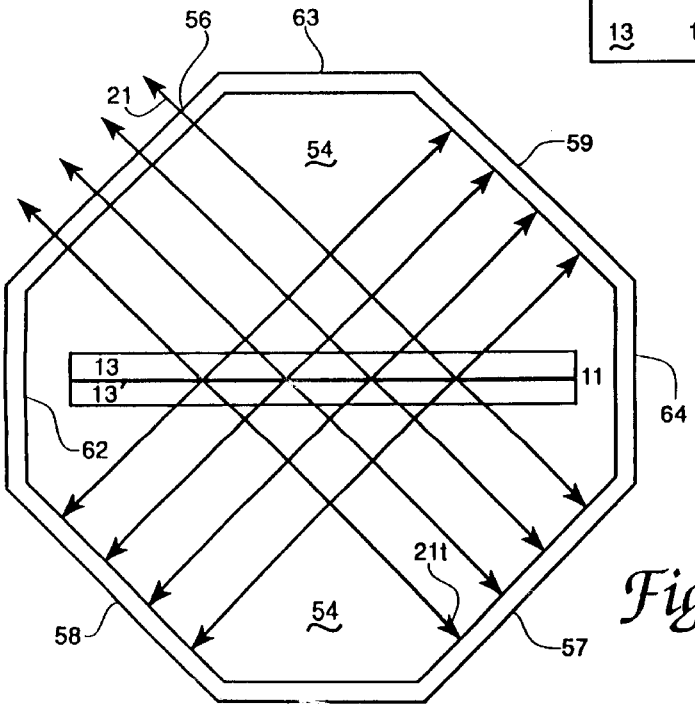
FIG. 5 shows an alternative arrangement to that of FIG. 4*a* including an optical cavity defined between substrates and optional films all within a cell containing index matching liquid and bounded by oppositely disposed parallel window and/or mirror pairs connected in a manner permitting a change in angle and spacing between adjacent window and/or mirror elements.

FIG. 5 is an alternative to the FIG. 4*a* configuration and requires fewer elements and permits a wider range of material utilization since plane windows are used instead of prisms. The substrates and cavity are the same as in earlier figures except that in the FIGS. 4*a*,5 arrangements, external coatings are not needed on the substrates. The prisms, external windows and substrates can be of the same material and joined by index matching fluid 54. Fluid 54 may be contained by an entrance window 56 and elements 57,58,59 which may be transparent and antireflection coated or optionally coated to reflect broadly or selectively and may be oriented or displaced, being connected by deformable joints 61,62,63,64 between adjacent elements 56–59, in a manner providing the same conditions of exposure of material 11 as afforded by the various options discussed above in connection FIG. 4*a*. A question about the use of an index matching liquid cell is whether heating by the curing laser would cause turbulence in the index matching fluid therefore destroying the desired spatial coherence of the curing light.

If a single laser line is used to sensitize and optionally induce modulation in material 11, the index matching fluid needs to match the index of adjacent optical elements only at that wavelength. If multiple lines from a laser or broadly emitting source are used to sensitize material 11, index matching fluids for a broad range of wavelengths are needed. Matching fluids for fused silica are available (from R. P. Cargille Laboratories, Inc., Cedar Grove N.J.).

Figure 6:
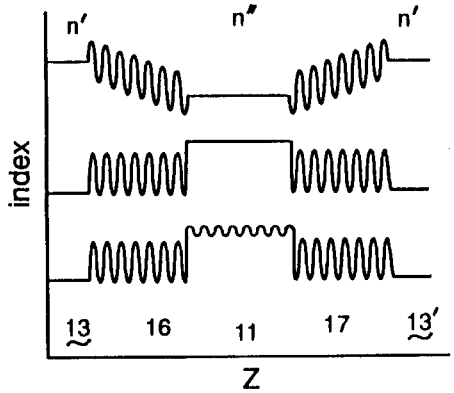
FIG. 6 illustrates the use of modulated index films as the bounding reflectors of a (Fabry-Perot) optical cavity.

In FIG. 6, plots a b, and c represent index modulated films 16,17 bounding material 11 in a resonant cavity where the material 11 in c has been cured to a modulated state. Films 16 and 17 are designed to either eliminate unwanted reflections or to provide that the reflections from a stepwise index change are in phase with those from the periodic structure. A continuous modulation shown for the films can be replaced by a multilayer modulation comprising (ideally) small discontinuous changes in index. The thickness of material 11 is not drawn to scale since 11 should be substantially thicker than films 16,17. An objective is to induce index modulation in cured material 11 (FIG. 6, plot c) which is in phase with and of the same optical period (index times modulation period) as that of films 16,17.

Both sides of the substrates and associated films 16,17 for F-P cavities must be optically flat (such as λ/20) so that interference patterns will approximate the desired ideal patterns. Commonly available optical flats such as fused quarts or Pyrex™ (borosilicate glass) may be used as can any other common optical material that can be suitably polished, even those that are not isotropic; laser light may be highly polarized so anisotropic windows and substrates may be cut and oriented in a manner such that incident polarized light remains as one beam. Individual substrates need not have strictly parallel surfaces since a variation in phase and k vector direction caused by slight wedging can be compensated by adjusting the tilt of mirrors 27,28,35 or 57,58,59. Reflections from refractive index discontinuities that would clutter a standing wave pattern can be minimized by antireflection coatings.

F-P cavity spacing can be established by using some kind of spacer material having a uniform dimension, or the substrates might be grasped in some manner and manipulated to maintain the cavity dimensions prior to and during curing. If rigid spacers are used around the periphery of cavity 15 and material 11 shrinks during cure, it may disbond from the substrate material. This is undesirable unless substrate and film are intended to be separated, and may be avoided if the spacer material is capable of deforming under the adhesive forces between material 11 and the substrate. For example, the spacer material may soften and deform at a curing temperature higher than the temperature at which the material is optically sensitized.

If the objective is to make a large area Bragg interference type filter having one or more superimposed index modulations then it may be possible to develop a filter having approximately uniform spectral performance even when the thickness of the optical cavity is nonuniform. This may be achieved by sensitizing adjacent areas in turn by angle tuning to a resonance permitting the $\Delta x$ value closest to the desired value while using a beam whose cross section is of the order of areas for which optical path lengths are uniform to a fraction of a wavelength.

First surface mirrors or beamsplitters of metal film with an overlay coating providing high reflection of a specified wavelength and deposited on low expansion material having flatness of $\lambda/20$ are readily available. The optical flatness required for the mirrors and other optical elements depends on details of the optical arrangement and the properties of the cavity materials. For example, limiting beam cross section will limit the paths taken by the light producing interference within an area of material 11 and the light will pass through or reflect from a limited portion of each optical element; the size of these areas should correspond to the flatness (and parallelism if applicable) of the elements themselves as well as the accuracies of orientation.

Liquid crystal material or material mixtures or liquid crystal polymers may be cured (locally oriented into a periodic array) more quickly and may attain a higher degree of refractive index modulation or induced birefringence than by other means as a result of being cured under a resonance condition within a resonant cavity because of the increased intensity provided by a resonating optical afield. Thus it is anticipated that for some applications curing in a plane resonant optical cavity will constitute an improvement on processes such as those described in U.S. Pat. No. 5,032,009.

Resonant cavity cure of a solid might involve the temporary displacement of ionic or electronic charge and/or orientation of polable units within a solid when the solid is disposed within or prepared as a resonant optical cavity, within the intent, for example, of using one or more laser beams to develop one or more resonant conditions within the resonant cavity in order to temporarily modify the included material to a desired useful state (cure) and thus dynamically control the transmission and/or propagation of one or more other beams as might occur in an optical computing application. In some cases the active material may be self-supporting and simply coated with an appropriate reflecting film which may be dielectric or metal and if necessary externally biased by an applied voltage.

A simple example is a plane optically polished solid electro optical material with curing light incident at a high angle of incidence resulting in high boundary reflectance and the development of a standing wave within the material causing an index modulation such as illustrated by 25 and 29 in FIGS. 1*a* and 2*b*, or by the more complicated modulation such as illustrated by 29,30,31,32 in FIG. 2*a*, which could be used to control the transmission or propagation of longer wavelength light incident at or near the cavity normal.

Another example might be a resonant cavity bounded by a matched pair of modulated films each having a moderately broad reflection band the cavity being angle tuned to transmit (resonate) a control (curing) laser beam or multiple beams within a selected region or regions causing internal refractive index modulation thereby modulating the transmission of another light beam or multiple beams of another wavelength in a corresponding area or areas of the resonant cavity.

The optical elements proposed for use in curing holographic or electrooptical material in an optical resonant cavity may be substantially any combination as would occur to one skilled in the art, and may comprise any suitable optical material suggested above or that would be selected by one skilled in the art.

The invention therefore provides a process for curing optical material within a plane optical resonant cavity. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for curing an optically sensitive material, comprising the steps of:

(a) forming a plane optical resonant cavity defined by partially reflecting plane parallel boundaries which reflect greater than 50 percent within a selected optical spectral wavelength range a light beam having a selected state of polarization and incident at a selected angle relative to a normal direction to said optical cavity;

(b) disposing at least one optically sensitive or optically curable material within said optical cavity; and (c) exposing said cavity and material therewithin to light of preselected wavelength in order to cure said material.

2. The method of claim 1 further comprising the step of orienting said cavity and said material disposed therein with respect to the direction of incidence of said light whereby one or more preselected optical standing wave patterns are generated within said cavity and said material in order to develop one or more distinct patterns of index modulation within said material upon cure thereof.

3. The method of claim 1 wherein the step of exposing said cavity and material therewithin is performed using a laser source.

4. The method of claim 3 wherein said laser source is selected from the group consisting of gas lasers, including argon, krypton, nitrogen, xenon, argon-krypton, xenon-chloride and xenon-fluoride lasers, dye, solid state, and semiconductor lasers, operated in a pulsed or continuous manner.

5. The method of claim 1 further comprising the step of using adjustable reflectors disposed adjacent said cavity for reflecting light into said cavity and for optionally establishing therewithin selective standing optical wave patterns capable of inducing a selected refractive index modulation pattern within said material.

6. The method of claim 5 wherein said positionable reflectors are disposed and oriented to establish within said cavity at least one selective standing wave pattern capable of inducing a selected refractive index modulation pattern within said material.

7. The method of claim 1 wherein said cavity is a Fabry-Perot cavity defined between a pair of partially transmissive boundaries selected from the group consisting of a pair of metallic films supported by a pair of transparent substrates, a pair of dielectric films supported by a pair of transparent substrates, means defining a pair of refractive index discontinuities, and a solid layer of electrooptic material having said metallic films or said dielectric films deposited thereon.

8. The method of claim 7 wherein said metallic films comprise a material selected from the group consisting of aluminum, silver, gold and copper of thickness less than about 200 A, and wherein said dielectric films comprise a material selected from the group consisting of the oxides, fluorides and nitrides of magnesium, silicon, aluminum, cerium, thorium, yttrium, lanthanum, zirconium, lead, zinc, indium, tin and titanium.

9. The method of claim 1 further comprising the step of enclosing said cavity, material and selected associated optical components within a temperature controlled and hermetically sealed chamber for environmental control of said cavity, material and associated optical components during cure.

10. The method of claim 1 wherein said optically sensitive material is one of a holographic material and an electrooptic material.

11. The method of claim 1 wherein said optically sensitive material is a polymer dispersed liquid crystal material.

12. The method of claim 3 further comprising adjustable reflectors disposed adjacent said cavity for reflecting light into said cavity and for optionally establishing therewithin selective standing optical wave patterns capable of inducing a selected refractive index modulation pattern within said material.

13. A method for fabricating an optical filter, comprising the steps of:

(a) forming a plane optical resonant cavity defined by partially reflecting plane parallel boundaries which reflect greater than 50 per cent within a selected optical spectral wavelength range for a light beam having a selected state of polarization and incident at a selected angle relative to a normal direction to said optical cavity;

(b) disposing within said cavity a film of at least one optically sensitive or optically curable material selected from the group consisting of holographic materials and electrooptic materials; and (c) exposing said cavity and film therewithin to light of preselected wavelength in order to cure said material and to produce a modulated refractive index pattern or a uniform refractive index through said material along said normal direction.

14. The method of claim 13 further comprising the step of orienting said cavity and film with respect to the direction of incidence of said light whereby one or more preselected optical standing wave patterns are generated within said cavity and film in order to develop one or more distinct patterns of index modulation within said material upon cure thereof.

15. The method of claim 13 further comprising the step of using adjustable reflectors disposed adjacent said cavity for reflecting light into said cavity and for optionally establishing therewithin selective standing optical wave patterns capable of inducing a selected refractive index modulation pattern within said material.

16. The method of claim 13 wherein the step of exposing said cavity and film therewithin is performed using a laser source selected from the group consisting of gas lasers, including argon, krypton, nitrogen, xenon, argon-krypton, xenon-chloride and xenon-fluoride lasers, dye solid state, and semiconductor lasers, operated in a pulsed or continuous manner.

17. The method of claim 13 wherein said cavity is a Fabry-Perot cavity defined between a pair of partially transmissive boundaries selected from the group consisting of a pair of metallic films supported by a pair of transparent substrates, a pair of dielectric films supported by a pair of transparent substrates, means defining a pair of refractive index discontinuities, and a solid layer of electrooptic or holographic material having said metallic films or said dielectric films deposited thereon.

18. The method of claim 17 wherein said metallic films comprise a material selected from the group consisting of aluminum, silver, gold and copper of thickness less than about 200 A, and wherein said dielectric films comprise a material selected from the group consisting the oxides, fluorides and nitrides of magnesium, silicon, aluminum, cerium, thorium, yttrium, lanthanum, zirconium, lead, zinc, indium, tin and titanium.

19. The method of claim 13 further comprising the step of enclosing said cavity and material within a temperature controlled hermetically sealed chamber for environmental control of said cavity and material during cure.

20. The method of claim 5 further comprising electrooptic or mechanical means for selectively changing the optical path length between said reflectors.

21. The method of claim 15 further comprising electrooptic or mechanical means for selectively changing the optical path length between said reflectors.

22. The method of claim 1 wherein said material is selected from the group consisting of $LiNbO_3$, $LiTaO_3$, $BaTiO_3$, $SrTiO_3$, $Ba_xSr_{(1-x)}Nb_2O_6$, and $Pb_{0.88}La_{0.08}Ti_xZr_{(1-x)}O_3$.

23. The method of claim 13 wherein said material is selected from the group consisting of $LiNbO_3$, $LiTaO_3$, $BaTiO_3$, $SrTiO_3$, $Ba_xSr_{(1-x)}Nb_2O_6$, and $Pb_{0.88}La_{0.08}Ti_xZr_{(1-x)}O_3$.

24. The method of claim 1 further comprising a plain optical mask disposed between the source of said light and said cavity.

25. The method of claim 13 further comprising a plain optical mask disposed between the source of said light and said cavity.

* * * * *